US008650413B2

(12) United States Patent  (10) Patent No.: US 8,650,413 B2
Bose et al.  (45) Date of Patent:  Feb. 11, 2014

(54) ON-CHIP POWER PROXY BASED ARCHITECTURE

(75) Inventors: Pradip Bose, Yorktown Heights, NY (US); Alper Buyuktosunoglu, White Plains, NY (US); Michael Stephen Floyd, Cedar Park, TX (US); Maria Lorena Pesantez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 12/749,179

(22) Filed: Mar. 29, 2010

(65) Prior Publication Data

US 2010/0268930 A1  Oct. 21, 2010

Related U.S. Application Data

(63) Continuation-in-part of application No. 12/424,161, filed on Apr. 15, 2009, now Pat. No. 8,271,809.

(51) Int. Cl.
*G06F 1/32*  (2006.01)
*G06F 1/26*  (2006.01)
*G06F 9/00*  (2006.01)

(52) U.S. Cl.
USPC ........... 713/300; 713/310; 713/320; 713/321; 713/322; 713/323; 713/324; 713/330; 713/340

(58) Field of Classification Search
USPC .................. 713/300, 310, 320–324, 330, 340
See application file for complete search history.

(56) References Cited

U.S. PATENT DOCUMENTS

| 5,719,800 | A  | 2/1998 | Mittal et al. |
| 5,812,860 | A  | 9/1998 | Horden et al. |
| 5,918,061 | A  | 6/1999 | Nikjou |
| 6,345,363 | B1 | 2/2002 | Levy-Kendler |
| 6,738,675 | B2 | 5/2004 | Dai |
| 6,910,120 | B2 | 6/2005 | Le et al. |
| 7,020,789 | B2 | 3/2006 | Sperber et al. |
| 7,047,398 | B2 | 5/2006 | Kurihara et al. |
| 7,051,177 | B2 | 5/2006 | Le et al. |
| 7,051,300 | B1 | 5/2006 | Shen et al. |
| 7,086,035 | B1 | 8/2006 | Mericas |
| 7,174,469 | B2 | 2/2007 | Luick |
| 7,188,262 | B2 | 3/2007 | Arends et al. |

(Continued)

OTHER PUBLICATIONS

Office Action regarding U.S. Appl. No. 12/424,161, dated Oct. 19, 2011, 24 pages.

(Continued)

*Primary Examiner* — Fahmida Rahman
(74) *Attorney, Agent, or Firm* — Yee & Associates, P.C.

(57) ABSTRACT

The embodiments provide an assigned counter of a first set of counters and stores a value for an activity of a set of activities forming a set of stored values. The value comprises the count multiplied by a weight factor specific to the activity. A power manager manages the first set of counters, receives a set of activities to be monitored for a unit, groups the portion into subsets based on at least one of a frequency of occurrence of each activity and power consumption for each activity, sums the stored values corresponding to each activity in each subset to reach a total value for each subset, multiplies the total value of each subset by factor corresponding to the subset to form a scaled value for each subset, and sums the scaled value of each subset to form a power usage value.

20 Claims, 7 Drawing Sheets

(56) References Cited

U.S. PATENT DOCUMENTS

| | | |
|---|---|---|
| 7,231,531 B2 | 6/2007 | Cupps et al. |
| 7,249,268 B2 | 7/2007 | Bhandarkar |
| 7,337,334 B2 | 2/2008 | Kuhlmann et al. |
| 7,337,339 B1 | 2/2008 | Choquette et al. |
| 7,389,403 B1 | 6/2008 | Alpert et al. |
| 7,406,610 B2 | 7/2008 | Kardach et al. |
| 7,430,672 B2 | 9/2008 | Rotem et al. |
| 7,444,526 B2 | 10/2008 | Felter et al. |
| 7,529,907 B2 | 5/2009 | Nemirovsky et al. |
| 7,610,537 B2 | 10/2009 | Dickinson et al. |
| 8,060,765 B1 * | 11/2011 | Cha et al. ............ 713/322 |
| 8,185,753 B2 * | 5/2012 | Oe et al. ............ 713/300 |
| 8,214,663 B2 | 7/2012 | Floyd et al. |
| 2006/0090086 A1 | 4/2006 | Rotem et al. |
| 2006/0288241 A1 | 12/2006 | Felter et al. |
| 2007/0150895 A1 | 6/2007 | Kurland |
| 2008/0222400 A1 | 9/2008 | Becker et al. |
| 2008/0307422 A1 | 12/2008 | Kurland et al. |
| 2009/0138737 A1 | 5/2009 | Kim et al. |
| 2009/0198385 A1 * | 8/2009 | Oe et al. ............ 700/296 |
| 2010/0268974 A1 | 10/2010 | Floyd et al. |
| 2010/0268975 A1 | 10/2010 | Bose et al. |

OTHER PUBLICATIONS

Notice of Allowance regarding U.S. Appl. No. 12/424,161, dated Apr. 4, 2012, 13 pages.

Weinsberg et al., "Tapping into the Fountain of CPUs—On Operating System Support for Programmable Devices", ASPLOS'08, Mar. 2008, Seattle, Washington, pp. 179-189.

Strozek et al., "Efficient Architectures through Application Clustering and Architectural Heterogeneity", CASES'06, Oct. 2006, Seoul Korea, pp. 190-201.

Hadzic et al., "Balancing Performance and Flexibility with Hardware Support for Network Architectures", ACM Transactions on Comptuter Systems, vol. 21, No. 4, Nov. 2003, pp. 375-411.

* cited by examiner

ON-CHIP POWER PROXY BASED ARCHITECTURE

This non-provisional patent application is a Continuation-in-Part and claims the benefit of priority of the filing date of U.S. Non-Provisional patent application Ser. No. 12/424,161, filed Apr. 15, 2009, the entire contents of which application are incorporated herein by reference.

This invention was made with United States Government support under Agreement No. HR0011-07-9-0002 awarded by DARPA. THE GOVERNMENT HAS CERTAIN RIGHTS IN THE INVENTION.

BACKGROUND

1. Field of the Invention

The present application relates generally to microprocessors. More specifically, the present application provides for estimating power consumption.

2. Description of the Related Art

As multi-core processors become more commonplace, power management issues become more important. Multi-core processors refer to a central processing unit that includes multiple complete execution cores per physical processor. The central processing unit combines multiple processors and their caches and cache controllers onto a single integrated circuit. Multi-core processors are well suited for multi-tasking environments because there are multiple complete execution cores instead of one, each with an independent interface to the front side bus. Since each core has its own cache, the operating system has sufficient resources to handle most compute intensive tasks in parallel.

Effective power management in a microprocessor requires measurement or approximation of power. However, the measurement of real, calibrated power consumption in hardware is a difficult and complex task, which might involve stalling the processor for proper calibration.

Accordingly, it would be advantageous to have a method and apparatus which takes into account one or more of the issues discussed above, as well as possibly other issues.

SUMMARY

An illustrative embodiment provides a computer-implemented method for estimating power consumption. The computer implemented method comprises receiving a set of activities for a unit from an authorized user. The method stores a value for each activity of a portion of the set of activities in an assigned counter of a first set of counters, forming a set of stored values. The value comprises a count of how many times the activity happened in a specified period of time multiplied by a weight factor specific to the activity. The method groups the portion of the set of activities into subsets based on at least one of a frequency of occurrence of each activity of the portion of the set of activities and power consumption for each activity of the portion of the set of activities. The method sums the stored values corresponding to each activity in each subset to reach a total value for each subset. The method multiplies the total value of each subset by one of a set of factors corresponding to the subset to form a scaled value for each subset. The method receives, at a power manager, a power usage value to a power manager, comprising a summation of the scaled value of each subset. The power usage value may be an estimation of the power consumption of the portion of the set of activities. The power manager adjusts the operational parameters of the unit based on a comparison of the power usage value to a threshold value.

Another illustrative embodiment provides a data processing system for estimating power consumption. An assigned counter of a first set of counters stores a value for an activity of a set of activities forming a set of stored values. The value comprises the count multiplied by a weight factor specific to the activity. A power manager manages the first set of counters. The power manager receives, from an authorized user, a set of activities for a unit. The power manager groups a portion of the set of activities into subsets based on at least one of a frequency of occurrence of each activity of the portion of the set of activities and power consumption for each activity of the portion of the set of activities. The power manager sums the stored values corresponding to each activity in each subset to reach a total value for each subset. The power manager multiplies the total value of each subset by factor corresponding to the subset forming a scaled value for each subset. The power manager sums the scaled value of each subset to form a power usage value. The power usage value may be an estimation of the power consumption of the portion of the set of activities. The power manager adjusts the operational parameters of the unit based on a comparison of the power usage value to a threshold value.

Yet another illustrative embodiment provides a computer program product for estimating power consumption. The computer program product comprises a computer usable storage medium including computer usable program code for estimating power consumption within a multi-core microprocessor chip. The computer-implemented method comprises computer usable program code for receiving a set of activities for a unit from an authorized user. The computer-implemented method comprises computer usable program code for storing a value for each activity of a portion of the set of activities in an assigned counter of a first set of counters, forming a set of stored values. The value comprises a count multiplied by a weight factor specific to the activity. The computer-implemented method comprises computer usable program code for grouping the portion of the set of activities into subsets based on at least one of a frequency of occurrence of each activity of the portion of the set of activities and power consumption for each activity of the portion of the set of activities. The computer-implemented method comprises computer usable program code for summing the stored values corresponding to each activity in each subset to reach a total value for each subset. The computer-implemented method comprises computer usable program code for multiplying the total value of each subset by factor corresponding to the subset to form a scaled value for each subset. The computer-implemented method comprises computer usable program code for receiving, at a power manager, a power usage value comprising a summation of the scaled value of each subset. The power usage value may be an estimation of the power consumption of the portion of the set of activities. The computer-implemented method comprises computer usable program code for adjusting the operational parameters of the unit based on a comparison of the power usage value to a threshold value.

BRIEF DESCRIPTION OF THE SEVERAL VIEWS OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
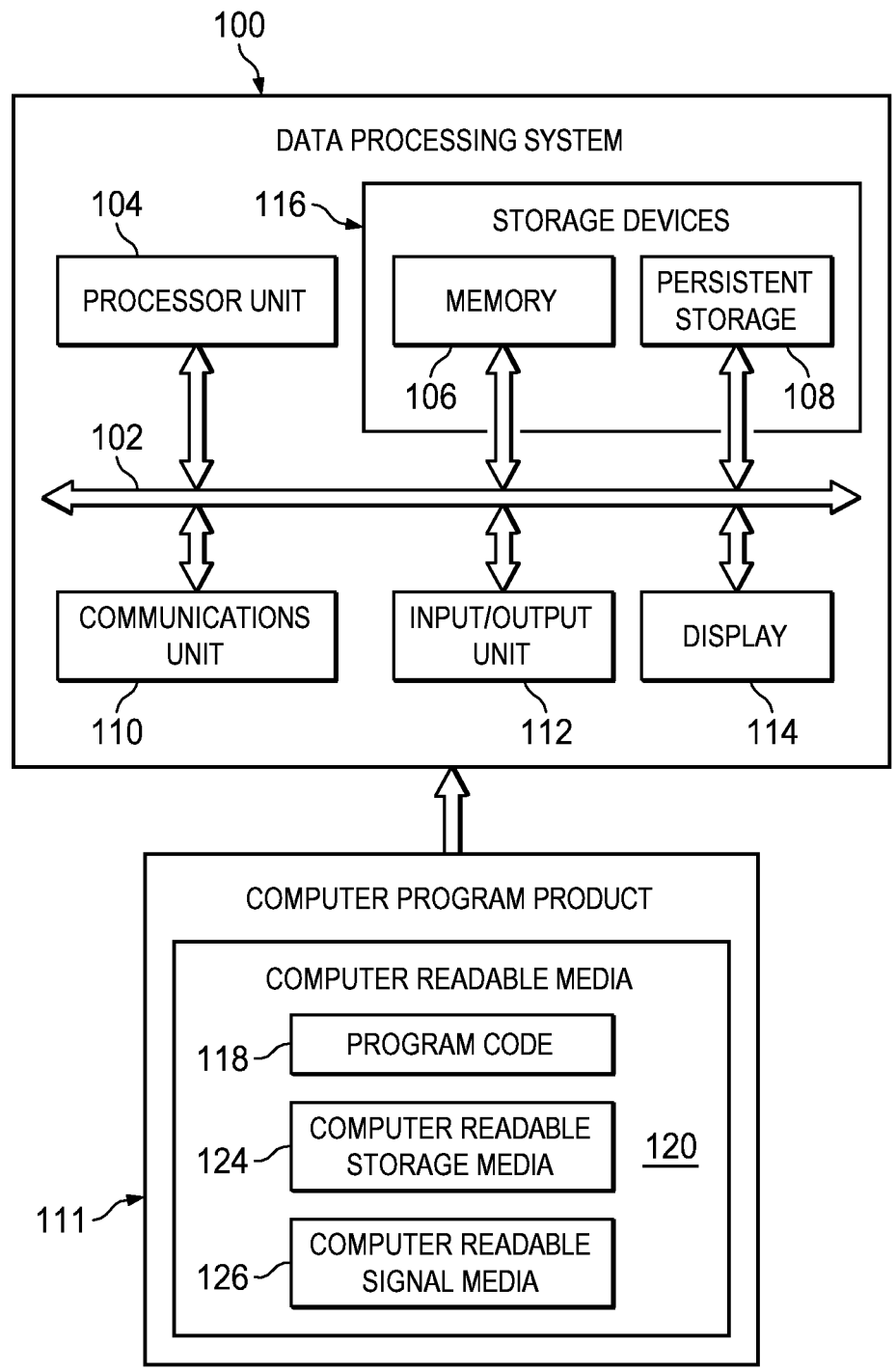
FIG. 1 is a block diagram of a processor system for processing information, in accordance with an illustrative embodiment.

As will be appreciated by one skilled in the art, the illustrative embodiments may be embodied as a system, method or computer program product. Accordingly, aspects of the illustrative embodiments may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can store a program for use by or in connection with an instruction execution system, apparatus, or device.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, apparatus (systems) and computer program products according to the illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The embodiments provide an assigned counter of a first set of counters and stores a value for an activity of a set of activities forming a set of stored values. The value comprises the count multiplied by a weight factor specific to the activity. A power manager manages the first set of counters, receives a set of activities to be monitored for a unit, groups the portion of the set of activities into subsets based on at least one of a frequency of occurrence of each activity and power consumption for each activity, sums the stored values corresponding to each activity in each subset to reach a total value for each subset, multiplies the total value of each subset by factor corresponding to the subset to form a scaled value for each subset, and sums the scaled value plus a constant or variable coefficient of each subset to form a power usage value.

Turning to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a number of processors, may be a multi-processor core, or some other type of processor, depending on the particular implementation. A number as used herein with reference to an item means one or more items. Further, processor unit 104 may be implemented using a number of heterogeneous processor systems in which a main processor is present with secondary processors on a single chip. As another illustrative example, processor unit 104 may be a symmetric multi-processor system containing multiple processors of the same type. As used herein, "a number of" is one or more. For example, a number of processors means that there may be one processor or more than one processor.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or computer readable storage media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 111 in these examples. In one example, computer readable media 120 may be computer readable storage medium 124 or computer readable signal media 126. Computer readable storage media 124 may include, for example, an optical or magnetic disc that is inserted or placed into a drive or other device that is part of persistent storage 108 for transfer onto a storage device, such as a hard drive that is part of persistent storage 108. Computer readable storage medium 124 also may take the form of a persistent storage, such as a hard drive, a thumb drive, or a flash memory that is connected to data processing system 100. In some instances, computer readable storage media 124 may not be removable from data processing system 100. In these illustrative examples, computer readable storage media 124 is a non-transitory computer readable storage medium.

Alternatively, program code 118 may be transferred to data processing system 100 using computer readable signal media 126. Computer readable signal media 126 may be, for example, a propagated data signal containing program code 118. For example computer readable signal media 126 may be an electro-magnetic signal, an optical signal, and/or any other suitable type of signal. These signals may be transmitted over communication links, such as wireless communication links, optical fiber cable, coaxial cable, a wire, and/or any other suitable type of communications link. In other words, the communications link and/or the connection may be physical or wireless in the illustrative examples.

In some illustrative embodiments, program code 118 may be downloaded over a network to persistent storage 108 from another device or data processing system through computer readable signal media 126 for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
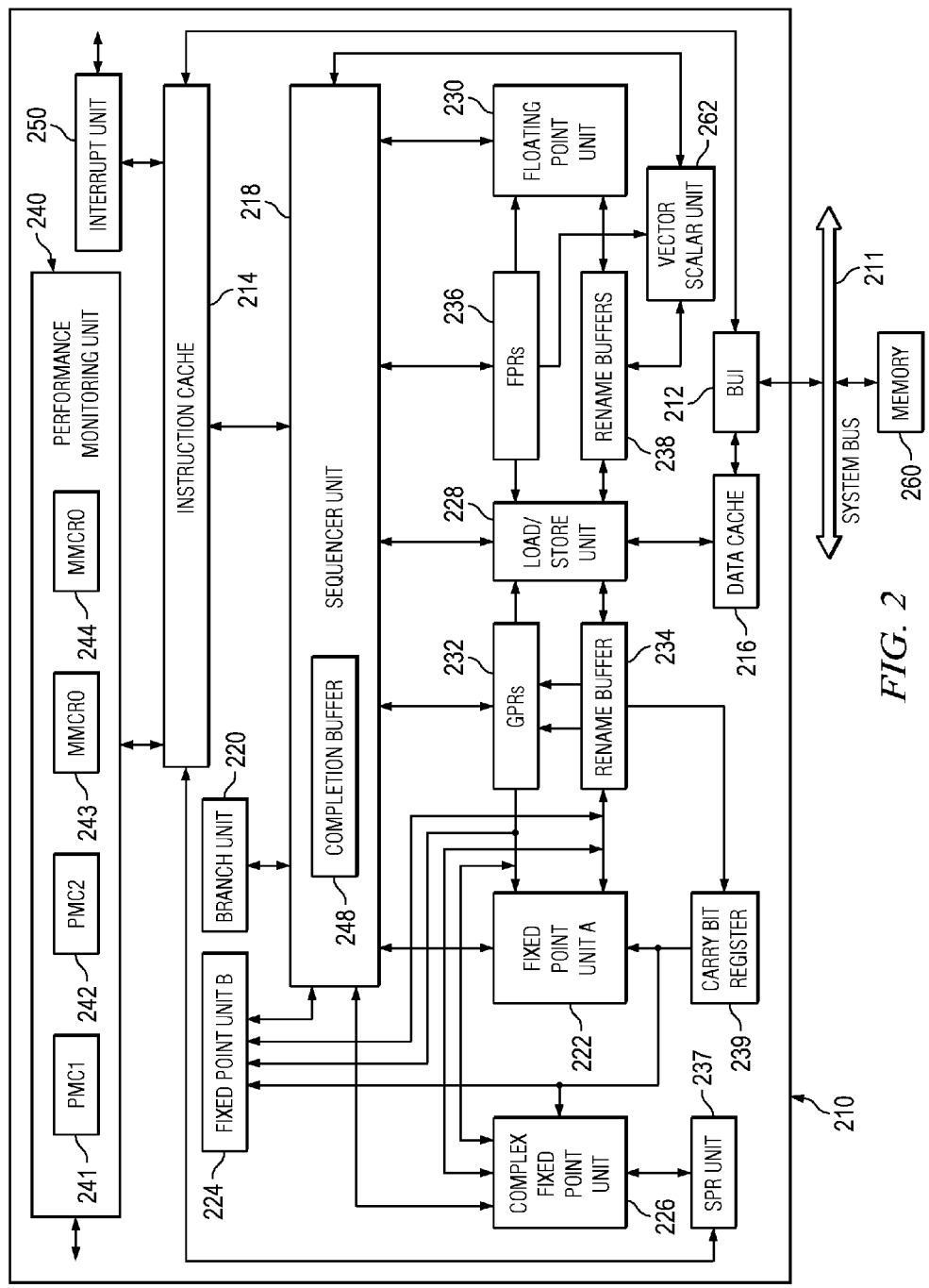
FIG. 2 is a block diagram of a processor system for processing information is depicted in accordance with in illustrative embodiment.

Turning next to FIG. 2, a block diagram of a processor system for processing information is depicted in accordance with in illustrative embodiment. Processor 210 may be implemented as processor unit 104 in FIG. 1.

In an illustrative embodiment, processor 210 is a single integrated circuit superscalar microprocessor. Accordingly, as discussed further herein below, processor 210 includes various units, registers, buffers, memories, and other sections, all of which are formed by integrated circuitry. Also, in the illustrative embodiment, processor 210 operates according to reduced instruction set computer ("RISC") techniques. As shown in FIG. 2, system bus 211 is connected to a bus interface unit ("BIU") 212 of processor 210. BIU 212 controls the transfer of information between processor 210 and system bus 211.

BIU 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the illustrative embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, vector scalar unit 262 and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results, destination operand information, of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results, destination operand information, of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs, through BIU 212 and system bus 211, such information from a system memory 260 connected to system bus 211. Moreover, data cache 216 is able to output, through BIU 212 and system bus 211 information from data cache 216 to system memory 260 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs to sequencer unit 218. These signals indicate suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs, through BIU 212 and system bus 211 such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location, for example, one of GPRs 232 or carry bit (CA) register 239, as specified by the instruction for which the selected rename buffer is allocated. Information stored at a selected one of rename buffers 234 is copied to its associated one of GPRs 232 or CA register 239 in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 may process multiple instructions simultaneously at various execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs, from instruction cache 214 one or more instructions from one or more memory addresses storing the sequence of instructions discussed further hereinabove in connection with branch unit 220, and sequencer unit 218.

In the decode stage, sequencer unit 218 decodes up to four fetched instructions. In the dispatch stage, sequencer unit 218 selectively dispatches up to four decoded instructions to selected, in response to the decoding in the decode stage ones of execution units 220, 222, 224, 226, 228, and 230 after reserving rename buffer entries for the results of the dispatched instructions, destination operand information. In the dispatch stage, operand information is supplied to the selected execution units for dispatched instructions. Processor 210 dispatches instructions in order of their programmed sequence.

In the execute stage, execution units execute their dispatched instructions and output results, destination operand information, of their operations for storage at selected entries in rename buffers 234 and rename buffers 238 as discussed further herein above. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its registers to indicate the stage in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions, for example, complex fixed-point instructions executed by CFXU 226, may require more than one cycle. Accordingly, a variable delay may occur between a particular instruction's execution and completion stages in response to the variation in time required for completion of preceding instructions.

Completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes performance monitor unit 240. The performance monitor unit 240 is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 240 includes an implementation-dependent number of counters 241-242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241-242. Counters 241-242 and MMCRs 243-244 are preferably implemented as SPRs that are accessible for read or write via MFSPR, move from SPR, and MTSPR, move to SPR, instructions executable by CFXU 226. However, in one alternative embodiment, counters 241-242 and MMCRs 243-244 may be implemented simply as addresses in I/O space. In another alternative embodiment, the control registers and counters may be accessed indirectly via an index register. This embodiment is implemented in the IA-64 architecture in processors from Intel Corporation.

The various components within performance monitoring unit 240 may be used to generate data for performance analysis. Depending on the particular implementation, the different components may be used to generate trace data. In other illustrative embodiments, performance unit 240 may provide data for time profiling with support for dynamic address to name resolution.

Additionally, processor 210 also includes interrupt unit 250, which is connected to instruction cache 214. Additionally, although not shown in FIG. 2, interrupt unit 250 is connected to other functional units within processor 210. Interrupt unit 250 may receive signals from other functional units and initiate an action, such as starting an error handling or trap process. In these examples, interrupt unit 250 is employed to generate interrupts and exceptions that may occur during execution of a program.

The different illustrative embodiments recognize and take into account a number of different considerations. For example, the illustrative embodiments recognize and take into account that with multi-core microprocessors predicting active power usage is difficult or impossible.

Thus, the illustrative embodiments provide for forming an estimate of per-chiplet power consumption within an electronic device by using a specially-architected, weighted counter-based architecture that monitors specific activities and forms an aggregate value. One example of an electronic device may be a multi-core processor chip. However, other electronic devices may be used in other illustrative embodiments. In an illustrative embodiment, the activity counted comprises events such as instructions dispatched, instructions completed, execution regfile access, execution pipe issue types, instruction fetch unit activity, load-store unit cache activity, load-store unit DERAT activity, load-store unit prefetch activities, L2 cache reads and writes, and L3 cache reads and writes. These counted events are multiplied by specifically architected weights and are added plus the constant value to form power proxy values. This approximated value is then used to adjust the operational parameters, such as frequency, voltage, or some other operational parameter or mode, of the chip in order to maintain a power usage goal. Some performance metrics may also be used by the power manager to achieve performance goals and/or wattage goals.

Illustrative embodiments also recognize and take into account for transistors that switch in a processor core so that activities can be approximated to calculate power. Illustrative embodiments approximate the power of core, L2 cache and L3 cache combination using digital counters on the chip. Activity event counters in the core, L2 cache, and L3 cache count specific activities. Each counted activity has a specific associated power use weight factor that relates to the power differential. Every time an activity happens, a value equal to the power use weight factor associated with the activity is added to a counter for the activity. An activity can happen multiple times in one cycle, thus the value would be added to the counter multiple times in the one cycle. By selectively weighting the different events relative to one another based on power modeling and empirical correlation work, the amount of power consumed by the chip can be approximated.

The counters for the various activities are located in one location, the power proxy unit, on the processor core. A multi-core microprocessor chip comprises chiplets, wherein a chiplet is a processor core plus some memory cache, such as an L2, L3, or L4 memory cache or some combination thereof. A multi-core microprocessor chip may also include some specialized units such as crypto or decompression assist units. These units are independently controllable units that can have their operational parameters or modes, such as frequency or voltage or other parameter changed based on the power proxy values. In one illustrative embodiment, a processor core is divided into physical regions and a power manager comprising power management firmware tracks power consumption on a per region basis.

In another illustrative embodiment, the power manager monitors how often an activity happens and what types of activities are issued in the pipeline in order to estimate power usage downstream. The power manager is external to the processor and may be located on the microprocessor as the core is being monitored. In another illustrative embodiment, the power manager is located on a dedicated micro controller.

Figure 3:
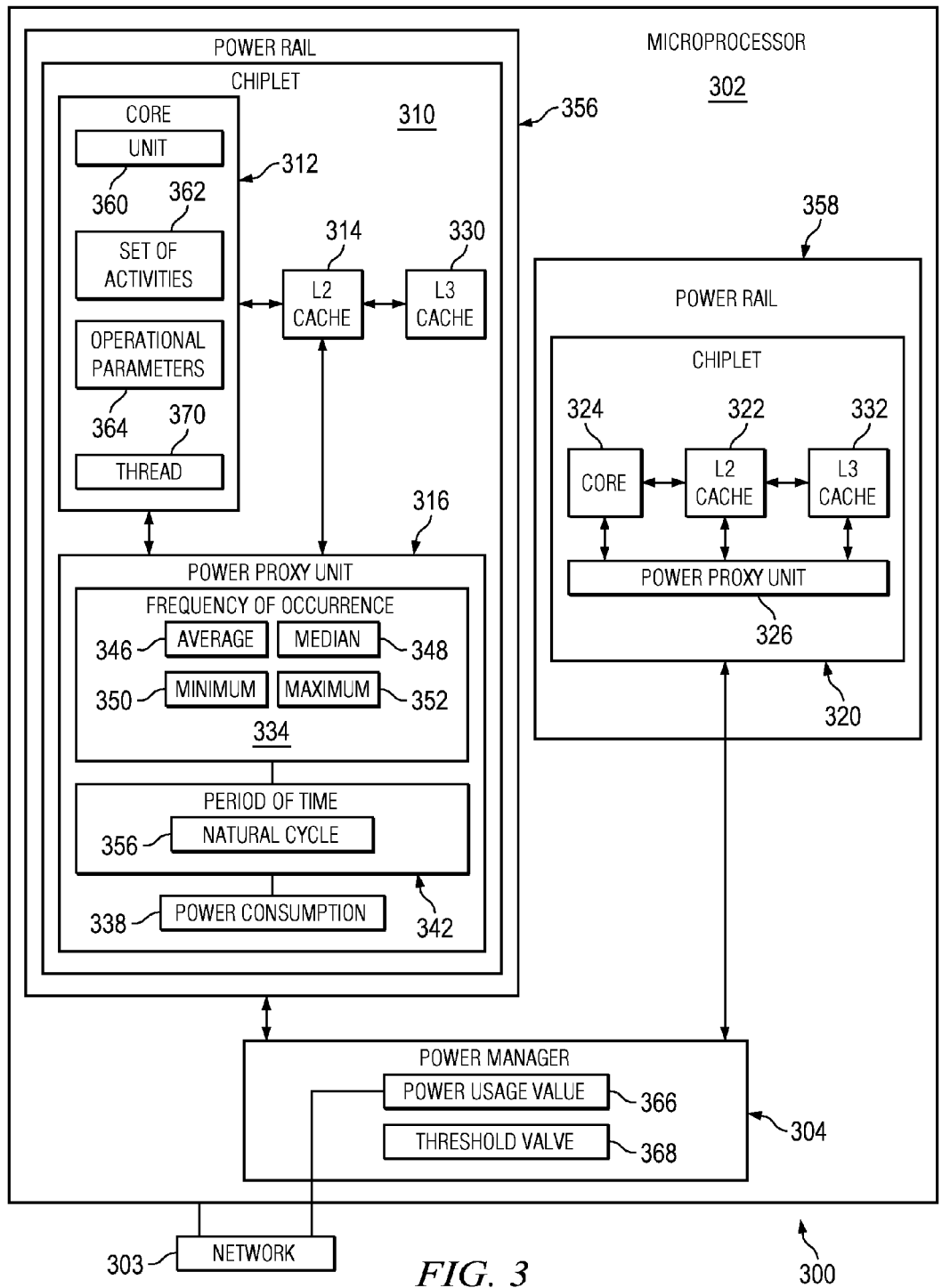
FIG. 3 is a block diagram of a system wherein microarchitecture for estimating of per-chiplet power consumption within a multi-core microprocessor chip may be implemented in accordance with an illustrative embodiment.

FIG. 3 is a block diagram of a system wherein microarchitecture for estimating per-chiplet power consumption within a multi-core microprocessor chip may be implemented in accordance with an illustrative embodiment. In computer engineering, microarchitecture, sometimes abbreviated to μarch or uarch, is a description of the electrical circuitry of a computer, central processing unit, or digital signal processor that is sufficient for completely describing the operation of the hardware. Thus, system 300 depicts a system for estimating of per-chiplet power consumption within a multi-core microprocessor chip on a microarchitectural level.

System 300 comprises microprocessor 302 and network 303. Microprocessor 302 also comprises power rail 356 and 358. Power rail 356 and 358 are supply voltage lines. Microprocessor 302 may be implemented as processor 210 in FIG. 2 and/or processor 104 of FIG. 1. Power manager 304 is a global, system-level power management controller. In an alternative embodiment, power manager 304 may be a separate dedicated micro controller or a processor core-level controller.

Microprocessor 302 comprises power manager 304 and chiplets 310 and 320. Chiplet 310 comprises core 312, L2 cache 314, L3 cache 330, and power proxy unit 316. Chiplet 320 comprises core 324, L2 cache 322, L3 cache 332, and power proxy unit 326. While FIG. 3 shows microprocessor 302 as comprising two chiplets, alternate illustrative embodiments contemplate microprocessor 302 comprising any number of chiplets. While not shown in FIG. 3, microprocessor 302 may comprise additional specialized units, such as crypto or decompression assist units, which communicate with a power proxy unit, such as power proxy unit 316, which reports to power manager 304.

Power proxy units 316 and 326 monitor a set of counters. The set of counters monitor a set of activities, such as, for example, set of activities 362 of core 312. The set of counters may also monitor a portion of set of activities 362. A portion may be some or all of set of activities 362. Set of activities 362 may also be separated physically and/or logically. For example, set of activities 362 may be separated by physical devices where there is one power proxy unit for each device. In different illustrative embodiments, multiple power proxy units are assigned to a single device and separate set of activities 362 logically. Power proxy units 316 and 326 may be partitioned based on regions or "units," such as unit 360, whose operational parameters or workloads can be independently controlled or modified in response to a power proxy reading. A region or unit 360 may be, for example, a collection of physical electronic circuits. For example, logically multiple tasks, threads of operation, may share the same unit 360. On a multiprocessor chip, each physical core may be a physical "unit" and have its own power proxy, and if that core has multiple threads of execution, the core may provide multiple power proxies per core to account for each different logical workload running.

Whenever an activity in set of activities 362 specified to be monitored occurs, a value equal to a power usage weight associated with the activity is added to a counter. The counter is associated with one activity only. Then, periodically, the values held in the set of counters monitored by power proxy units 316 and 326 are collected by power proxy units 316 and 326. Power proxy units 316 and 326 each add these collected values together to arrive at a power usage estimate for the unit monitored by each of power proxy units 316 and 326. For example, power proxy unit 316 monitors unit 360. Unit 360 may be a chiplet, thread 370, or a specialized unit such as a crypto or decompression assist engine. These power usage estimates are sent to power manager 304.

As part of the power usage estimate, power proxy unit 316 may group activities of set of activities 362 into subsets by frequency of occurrence 334 and/or power consumption 338 of each activity. Frequency of occurrence 334 is the number of occurrences over period of time 342. Period of time 342 may be any set period of time, by a user, or may be natural cycle 356. Natural cycle 356 may be, for example, but not limited to, a certain block of instruction of program code, loops in code, length of time, or any other natural set of time that an activity might occur. Frequency of occurrence 334 is the number of times an activity may occur. Frequency of occurrence 334 may be based on a number of factors, such as, for example, average 346, median 348, minimum 350, and maximum 352 of an activity over a given time period.

Power manager 304 compares the power usage estimates, such as power usage value 366, to a predetermined threshold, such as threshold value 368, and adjusts operational parameters 364 of each unit based on the comparison, in order to achieve the power usage goals. Operational parameters 364 may be adjustable features of microprocessor 302 which can be adjusted to change the power consumption of microprocessor 302. For example, a power usage goal could be a specific power usage cap. Based on the estimate, if the power usage is not being exceeded, the system can be sped up, that is, the frequency can be increased. If the power usage estimate exceeds the cap, then the system can be slowed down. Thus, the power manager is self-learning based on the power signature. The frequency at which the data is collected can be a number of milliseconds as opposed to a number of cycles, as the frequency may vary.

Each power proxy unit manages a set of counters. The power proxy unit collects the stored values for the set of counters the power proxy unit manages in parallel. Further, a single power manager manages a plurality of power proxy units. Each power proxy has one or more units assigned that the power proxy unit monitors. The power proxy units may then collect values in parallel or independently of each other. Further, the collection period is configurable for each power proxy unit and each power proxy unit may collect the stored values for different periods than every other power proxy managed by a power manager.

Power manager 304 and power proxy units 316 and 326 have memory and a programmable interface that allows a user to specifically assign what specific counters will count what specific activities as well as assigning the weight and the constant to the activity. Illustrative embodiments track activity metrics on a per-chiplet basis. In another illustrative embodiment, the metrics are tracked on a per thread basis. Activity counters track activities in a core, in an L2 cache, and in an L3 cache, and reset once read by the power manager.

Counts for each of these activities are counted in a counter. The individual counts are then multiplied by a weight factor specific to that particular activity to reach a value and that value is stored in an activity counter. A weight can be any value including zero as a means of excluding activity from a particular calculation. In an illustrative embodiment the weight factor comprises four bits. In other illustrative embodiments the weight factor can be comprised of any number of bits.

Network 303 may be a number of other microprocessors connected to microprocessor 302 through a wired or wireless network. In one or more illustrative embodiments, power manager 304 may gather power usage values and adjust parameters from the other microprocessors throughout the network.

The illustration of components in FIG. 3 is not meant to imply physical or architectural limitations to the manner in which different illustrative embodiments may be implemented. Other components in addition to, or in place of, the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, more than one power proxy unit 316 may be present for each power rail 356. In other illustrative embodiments, power proxy unit 316 may be located off of power rail 356 and on power manager 304.

Figure 4:
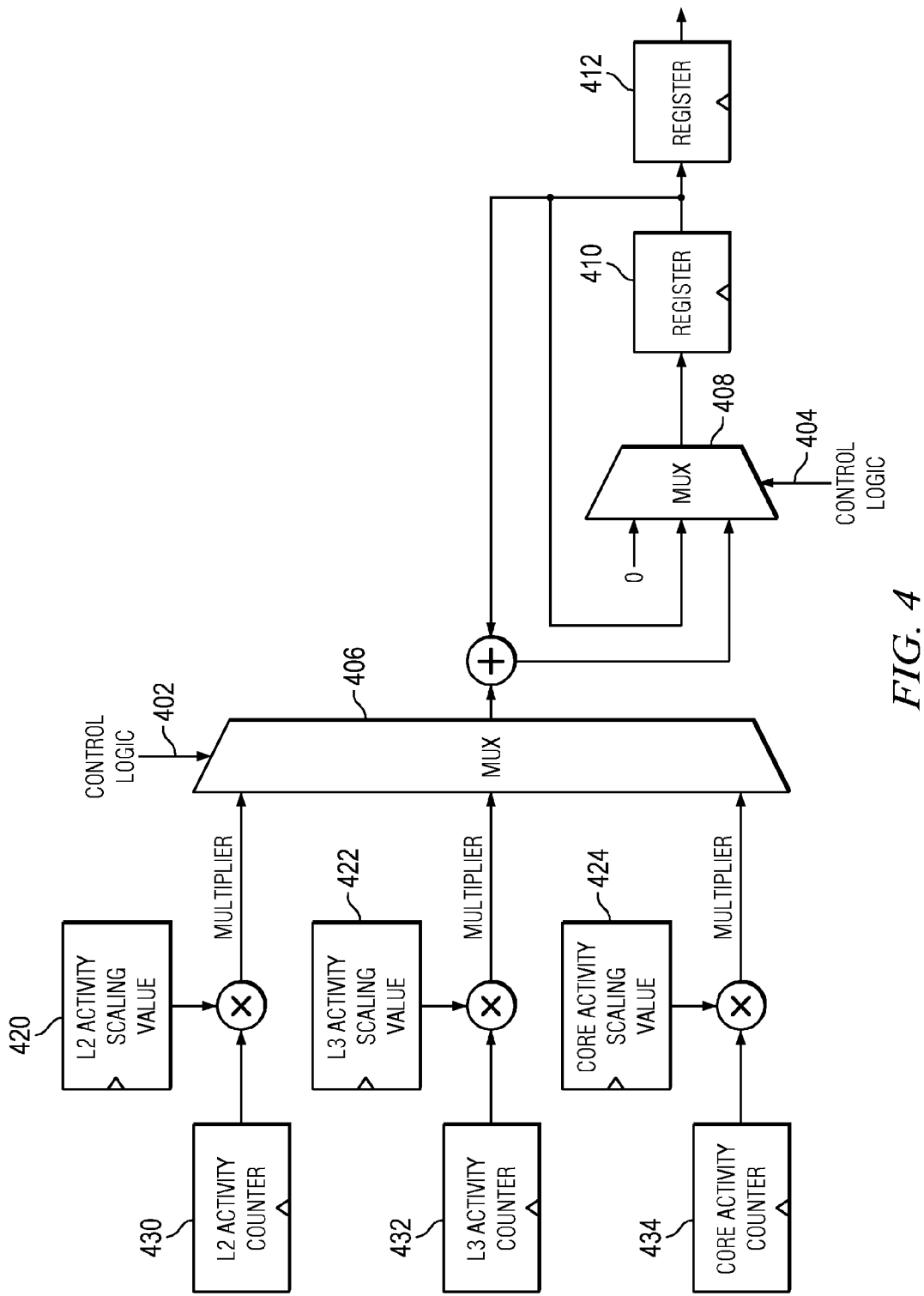
FIG. 4 is a block diagram of a power proxy unit in accordance with an illustrative embodiment, in accordance with an illustrative embodiment.

FIG. 4 is a block diagram of a power proxy unit in accordance with an illustrative embodiment. FIG. 4 may be implemented as power proxy unit 316 in FIG. 3. When received by a power proxy unit, the values in the L2 activity counter 430, L3 activity counter 432, and core activity counter 434 are multiplied by a scaling factor associated with the L2, L3 or core activity accordingly, such as L2 activity scaling value 420, L3 activity scaling value 422, and core activity scaling value 424. In one or more illustrative embodiments, one of these scaling values may be one. These adjusted values are received by MUX 406. MUX 406 and 408 are implemented in hardware. Control logic 402, from a finite state machine (not shown) of the power proxy unit, determines which adjusted value, the adjusted L2 activity value, the adjusted L3 activity value, or the adjusted core activity value is selected to be summed by the power proxy unit. At MUX 408, control logic 404, from a finite state machine (not shown) of the power proxy unit, determines what value is to be added to register 410, either zero, or the value already in register 410, or the adjusted activity value selected by control logic 402. Once register 410 overflows, the value in register 410 is added to the value in register 412. The value in register 412 is collected periodically by a power manager, such as power manager 304 in FIG. 3.

Figure 5:
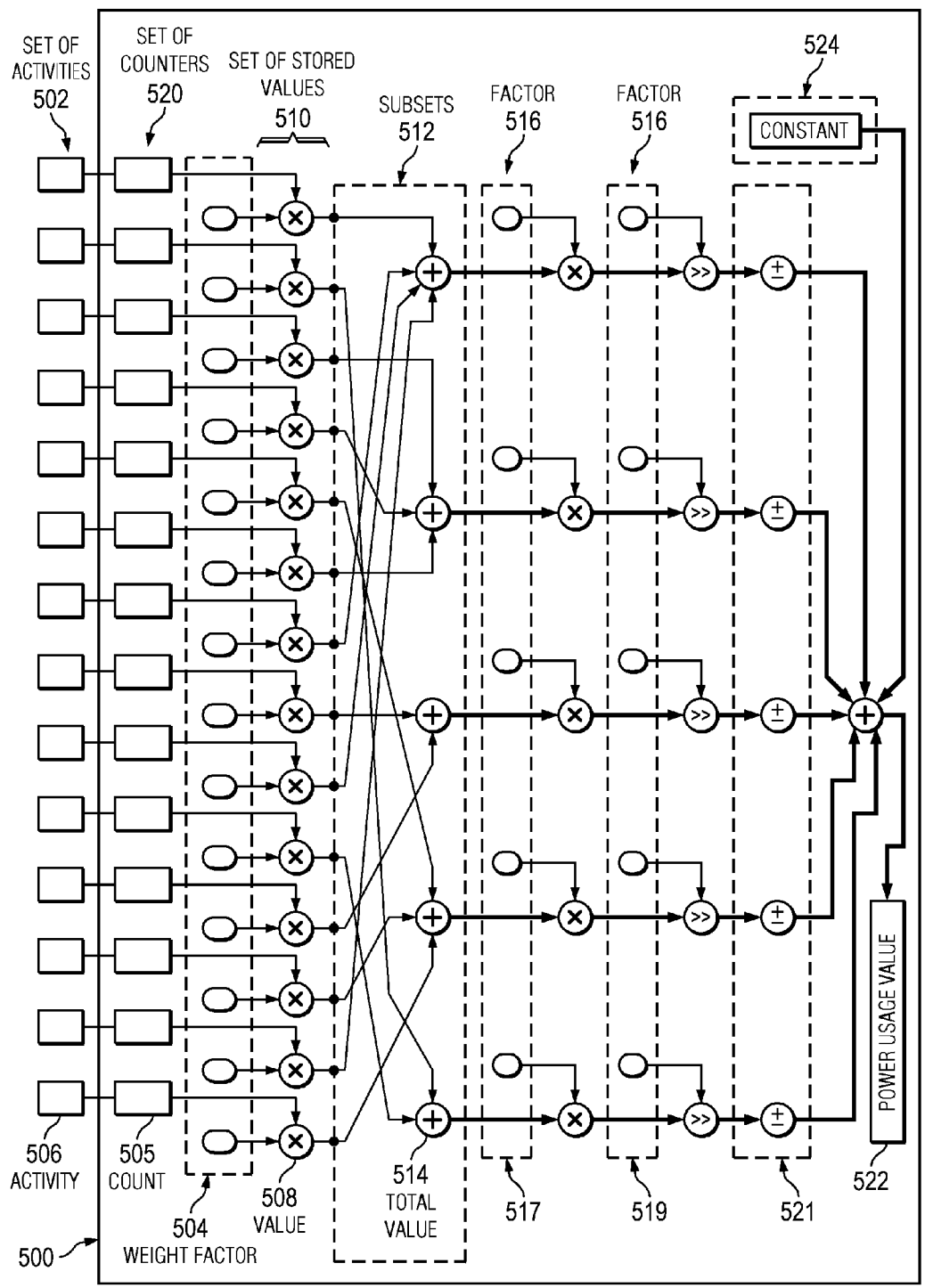
FIG. 5 is a block diagram illustrating a methodology of estimating power usage in accordance with an illustrative embodiment.

FIG. 5 is a block diagram illustrating a description of estimating power usage in accordance with an illustrative embodiment. Description 500 is a chart showing the process of estimating power usage. Description 500 may be implemented in a microprocessor, such as microprocessor 302 as shown in FIG. 3.

Description 500 starts with set of activities 502. Set of activities 502 may be referred to as instructions executed, activities, and/or events. Each activity 506 of set of activities 502 is an action performed by a component or components of the system, such as a transistor switching or a plurality of transistors interacting with each other. Set of activities 502 comprises events such as instructions dispatched, instructions completed, execution regfile access, execution pipe issue types, instruction fetch unit activity, load-store unit cache activity, load-store unit DERAT activity, load-store unit prefetch activities, L2 cache reads and writes, and L3 cache reads and writes.

Set of counters 520 count the executions of each activity 506 of set of activities 502. Count 505 of each activity 506 is multiplied by weight factor 504 to get to value 508. The set of counters 520 multiplied by weight factor 504 to form set of stored values 510. Each value 508 of set of stored values 510 is then grouped and added into subsets 512. In one or more illustrative embodiments, subsets 512 may correspond to frequency of occurrence of activity 506. To group by frequency of occurrence of activity 506, grouping may be done using at least one of an average of occurrence of activity, a median of occurrence of activity, a maximum of occurrence of activity, and a minimum of occurrence of activity. A period of time, when determining frequency, may be determined by a natural cycle of execution of the set of activities. In other illustrative embodiments, subsets 512 may correspond to power consumption. Subsets 512 may also correspond to where the activity occurs, such as L2 cache activity subset, core activity subset, and L3 cache activity subset.

The phrase "at least one of" may be defined as using any number of features following the phrase "at least one of." For example, the phrase "at least one of A, B, and C" means that either A, B, or C may be selected or any combination thereof. For example, A may be selected by itself. In another example, A and B may be selected. In yet another example, B and C may be selected. In yet another example, A, B, and C may be selected. Additionally, other examples are present.

In one or more illustrative embodiments, subsets 512 are grouped by a combination of frequency of occurrence, power consumption, and location of where the activity occurs. For example, subsets 512 may be grouped with first the frequency of occurrence, then further grouped by location. In another example, subsets 512 may be grouped by frequency of occurrence and power consumption combined into the same subset, then further grouped by location. In yet another example, subsets 512 may be grouped by location, then by power consumption.

Each subset in subsets 512 will have total value 514. Total value 514 at this point is the counts of set of counters 520 multiplied by weight factor 504 and then added in each activities subset. Total value 514 is adjusted by factor 516. Factor 516 may include multiplier 517 and shift 519 or any other arithmetic or logic calculation. Multiplier 517 may be, for example, a 4-bit multiplier. Shift 519 may be, for example, a 2-bit right shift. Multiplier 517 and shift 519 may be other values and other directions for the shift, such as a left shift. Programmable sign 521 is added to the value for each subset after factor 516 has been applied. In one or more illustrative embodiments, some activities may be double-counted at different stages of the pipeline. Therefore, a subtraction is made of one of the double counted activities. The subtraction may be done by adding a negative sign to certain values. Even though programmable sign 521 is located after shift 519 in FIG. 5, it is understood that programmable sign 521 may be located in other parts of description 500, such as, for example, after set of counter 520. Each subset and/or counter may be positive or negative. Negative activities may be needed to account for overestimation of power due to it being counted in different points down the pipeline.

The values from set of activities 502 plus constant 524 get combined into power usage value 522. Power usage value 522 is the estimation of power consumption of a particular event or instruction. It is understood that constant 524 may or may not be used. Constant 524 may be, for example, a 24-bit constant value. Constant 524 may also be a variable value, varying according to frequency, voltage, multithread/single-thread mode, memory-bound/core-bound executables and other considerations. Constant 524 may also be self learning which means that constant 524 would adapt and change based on information received.

Figure 6:
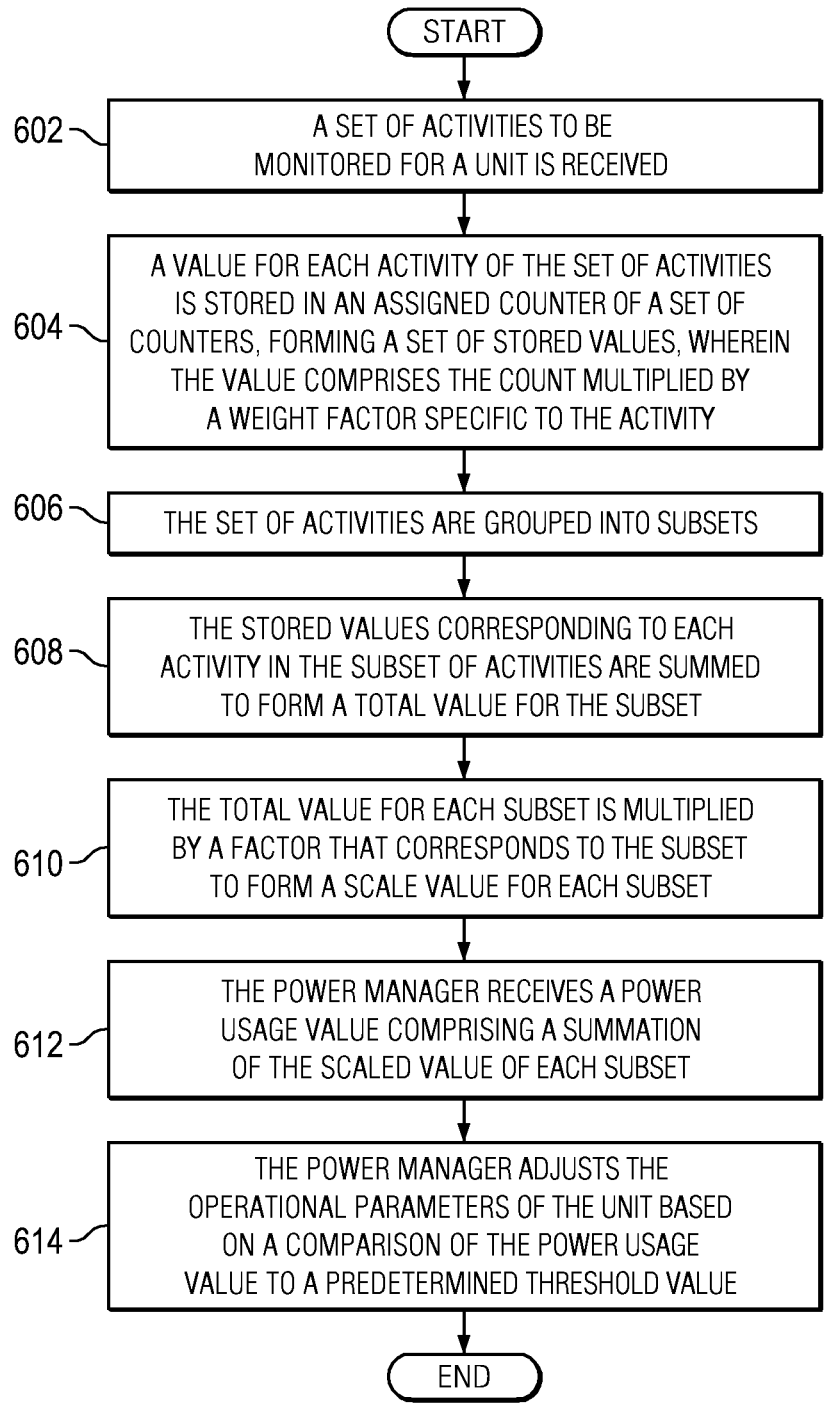
FIG. 6 is a flowchart illustrating the operation of estimating power consumption within a multi-core microprocessor chip at a high level, in accordance with an illustrative embodiment.

FIG. 6 is a flowchart illustrating the operation of estimating power consumption within a multi-core microprocessor chip at a high level, in accordance with an illustrative embodiment. The operation of FIG. 6 may be implemented in a microprocessor, such as microprocessor 302 of FIG. 3. The operation begins when a set of activities to be monitored for a unit is received from an authorized user (step 602). A value for each activity of the set of activities is stored in an assigned counter of a set of counters, forming a set of stored values, wherein the value comprises the count multiplied by a weight factor specific to the activity (step 604). The set of activities are grouped into subsets (step 606). In one or more illustrative embodiments, subsets may correspond to frequency of occurrence of activity. By grouping by frequency of occurrence of activity, grouping may be done using at least one of an average of occurrence of activity, a median of occurrence of activity, a maximum of occurrence of activity, and a minimum of occurrence of activity. In different illustrative embodiments, a weighted average of the occurrence of the activity may be used. In other illustrative embodiments, subsets may correspond to power consumption. Subsets may also correspond to where the activity occurs, such as L2 cache activity subset, core activity subset, and L3 cache activity subset. Also, subsets may be skipped altogether. For example, subsets may be skipped when there are no physical space limitations, such as in a software embodiment.

In one or more illustrative embodiments, subsets are grouped by a combination of frequency of occurrence, power consumption, and location of where the activity occurs. For example, subsets may be grouped with first the frequency of occurrence, then further grouped by location. In another example, subsets may be grouped by frequency of occurrence and power consumption combined into the same subset, then further grouped by location. In yet another example, subsets may be grouped by location, then by power consumption.

The stored values corresponding to each activity in the subset of activities are summed to form a total value for the subset (step 608). The total value for each subset is multiplied by a factor that corresponds to the subset to form a scaled value for each subset (step 610). For example, L2 activity scaling value 420 corresponds to L2 activity counter 430 in FIG. 4. A constant value may be added to the summation to account for leakage power or baseline power. In other illustrative embodiments, other factors may be used to determine a constant value. The power manager receives a power usage value comprising a summation of the scaled value of each subset (step 612) along with any constant. The power manager adjusts the operational parameters of the unit based on a comparison of the power usage value to a predetermined threshold value or other logic (step 614) and the operation ends.

Figure 7:
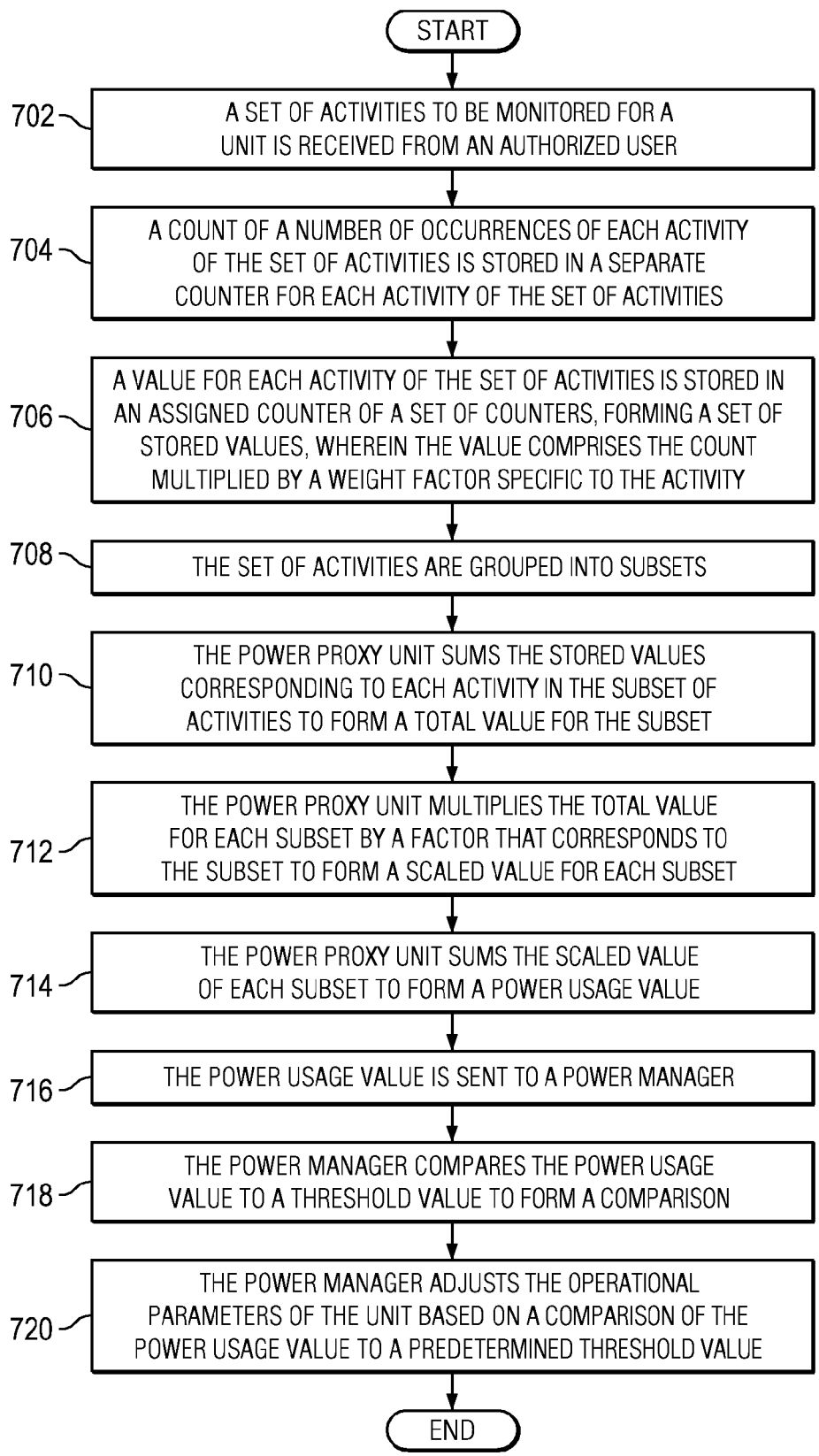
FIG. 7 is a flowchart illustrating the operation of estimating power consumption within a multi-core microprocessor chip in detail, in accordance with an illustrative embodiment.

FIG. 7 is a flowchart illustrating the operation of estimating power consumption within a multi-core microprocessor chip in detail, in accordance with an illustrative embodiment. The operation of FIG. 7 may be implemented in a microprocessor, such as microprocessor 302 of FIG. 3. The operation begins when a set of activities to be monitored for a unit is received from an authorized user (step 702). The unit can be a chip or a thread or a processing unit such as a crypto or decompression assist unit. Some examples of activity are execution regfile access, instructions dispatched, instructions completed, execution pipe issue types, L2 cache reads and writes, and L3 cache reads and writes. Additionally, an authorized user can also assign what counters are to be used to monitor the selected activities. The authorized user makes these selections through the use of a programmable interface. The authorized user can also assign the weight factors to the activities through the use of this interface.

A count of a number of occurrences of each activity of the set of activities is stored in a separate counter for each activity of the set of activities (step 704). A value for each activity of the set of activities is stored in an assigned counter of a set of counters, forming a set of stored values, wherein the value comprises the count multiplied by a weight factor specific to the activity (step 706). The weight factor is determined based on pre-silicon and post-silicon tuning. Each power proxy unit manages a set of counters. The power proxy unit collects the stored values for the set of counters the power proxy units manages in parallel. Further, a single power manager manages a number of power proxy units. Each power proxy has one or more units assigned that the power proxy unit monitors. The power proxy units may then collect values in parallel or independently of each other. Further the collection period is configurable for each power proxy unit and each power proxy unit may collect the stored values for different periods than every other power proxy managed by a power manager.

The set of activities are grouped into subsets (step 708). The power proxy unit sums the stored values corresponding to each activity in the subset of activities to form a total value for the subset (step 710). The power proxy unit multiplies the total value for each subset by a factor that corresponds to the subset to form a scaled value for each subset (step 712). The power proxy unit sums the scaled value of each subset to form a power usage value (step 714). A constant value may be added to the summation to account for leakage power or baseline power. In other illustrative embodiments, other factors may be used to determine a constant value. Any arithmetic or logic may be used when adding the constant. In other illustrative embodiments, a 32 or 64 bits floating point number for each activity may be used and the subsets may be skipped. The power usage value is sent to a power manager (step 716). The power manager compares the power usage value to a threshold value to form a comparison (step 718). The power manager adjusts the operational parameters of the unit based on a comparison of the power usage value to a predetermined threshold value (step 720) and the operation ends.

An illustrative embodiment provides a computer-implemented method for estimating power consumption within a multi-core microprocessor chip. The computer implemented method comprises receiving a set of activities to be monitored for a unit from an authorized user. The method stores a value for each activity of the set of activities in an assigned counter of a first set of counters, forming a set of stored values. The value comprises a count multiplied by a weight factor specific to the activity. The method groups the set of activities into subsets based on at least one of a frequency of occurrence of each activity of the set of activities and power consumption for each activity of the set of activities. The method sums the stored values corresponding to each activity in each subset to reach a total value for each subset. The method multiplies the total value of each subset by factor corresponding to the subset to form a scaled value for each subset. The method receives, at a power manager, a power usage value comprising a summation of the scaled value of each subset. The power manager adjusts the operational parameters of the unit based on a comparison of the power usage value to a threshold value.

Another illustrative embodiment provides a data processing system for estimating power consumption within a multi-core microprocessor chip. An assigned counter of a first set of counters stores a value for an activity of a set of activities forming a set of stored values. The value comprises the count multiplied by a weight factor specific to the activity. A power manager manages the first set of counters. The power manager receives, from an authorized user, a set of activities to be monitored for a unit. The power manager groups the set of activities into subsets based on at least one of a frequency of occurrence of each activity of the set of activities and power consumption for each activity of the set of activities. The power manager sums the stored values corresponding to each activity in each subset to reach a total value for each subset. The power manager multiplies the total value of each subset by factor corresponding to the subset forming a scaled value for each subset. The power manager sums the scaled value of each subset to form a power usage value, and adjusting the operational parameters of the unit based on a comparison of the power usage value to a threshold value. Additionally, other considerations, such as performance may also be used.

Yet another illustrative embodiment provides a computer program product for estimating power consumption within a multi-core microprocessor chip. The computer program product comprises a computer usable storage medium including computer usable program code for estimating power consumption within a multi-core microprocessor chip. The computer-implemented method comprises computer usable program code for receiving a set of activities to be monitored for a unit from an authorized user. The computer-implemented method comprises computer usable program code for storing a value for each activity of the set of activities in an assigned counter of a first set of counters, forming a set of stored values. The value comprises a count multiplied by a weight factor specific to the activity. The computer-implemented method comprises computer usable program code for grouping the set of activities into subsets based on at least one of a frequency of occurrence of each activity of the set of activities and power consumption for each activity of the set of activities. The computer-implemented method comprises computer usable program code for summing the stored values corresponding to each activity in each subset to reach a total value for each subset. The computer-implemented method comprises computer usable program code for multiplying the total value of each subset by factor corresponding to the subset to form a scaled value for each subset. The computer-implemented method comprises computer usable program code for receiving, at a power manager, a power usage value comprising a summation of the scaled value of each subset. The power manager adjusts the operational parameters of the unit based on a comparison of the power usage value to a threshold value.

The illustrative embodiments can take the form of an entirely hardware embodiment or an embodiment containing both hardware and software elements. In an illustrative embodiment, the embodiments are implemented in hardware and software, which includes, but is not limited to, firmware, resident software, microcode, etc.

Furthermore, the illustrative embodiments can take the form of a computer program product accessible form a computer-usable or computer-readable medium providing program code for use by, or in connection with, a computer or any instruction execution system. For the purposes of this description, a computer-usable or computer readable medium can be any tangible apparatus that can contain, store, communicate, propagate, or transport the program for use by, or in connection with, the instruction execution system, apparatus, or device.

The medium can be semiconductor system (or apparatus or device). Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The illustrative embodiments have been presented for purposes of illustration and description, and are not intended to be exhaustive or limited to the embodiments in the form disclosed. Many modifications and variations will be apparent to those of ordinary skill in the art. The illustrative embodiments were chosen and described in order to best explain the practical application and to enable others of ordinary skill in the art to understand the various embodiments with various modifications as are suited to the particular use contemplated.

The flowchart and block diagrams in the Figures illustrate the architecture, functionality, and operation of possible implementations of systems, methods and computer program products according to various embodiments of the illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the illustrative embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the illustrative embodiments has been presented for purposes of illustration and description, but is not intended to be exhaustive or limited to the illustrative embodiments in the form disclosed. Many modifications and variations will be apparent to those of ordinary skill in the art without departing from the scope and spirit of the illustrative embodiments. The embodiment was chosen and described in order to best explain the principles of the illustrative embodiments and the practical application, and to enable others of ordinary skill in the art to understand the illustrative embodiments for various embodiments with various modifications as are suited to the particular use contemplated.

What is claimed is:

1. A computer-implemented method for estimating power consumption in a microprocessor, the computer-implemented method comprising:
   receiving, from an authorized user, a set of activities for a unit;
   storing a value for each activity of a portion of the set of activities in an assigned counter of a plurality counters to form a set of stored values, wherein the value comprises a count multiplied by a weight factor specific to the activity;
   grouping, by a power proxy unit in the microprocessor, the portion of the set of activities into subsets based on a frequency of occurrence of each activity of the portion of the set of activities and power consumption for each activity of the portion of the set of activities;
   summing the stored values corresponding to each activity in each said subset to reach a total value for each said subset;
   multiplying the total value of each said subset by a factor corresponding to the subset to form a scaled value for each said subset;
   adding a programmable sign to each said scaled value for each said subset, wherein either a plus sign or a minus sign is added to each said scaled value for each subset, and wherein the plus sign is added to a first scaled value of a first subset and the minus sign is added to a second scaled value of a second subset, and wherein the programmable sign is used to reduce overestimation of power when ones of the set of activities are double counted; and
   receiving, at a power manager, a power usage value comprising a summation of the scaled value of each said subset, wherein the power usage value is an estimation of the power consumption of the portion of the set of activities.

2. The computer-implemented method of claim 1 further comprising:
   adjusting, by the power manager, the operational parameters of the unit based on a comparison of the power usage value to a threshold value.

3. The computer-implemented method of claim 1, wherein grouping the portion of the set of activities by frequency of occurrence of each activity of the portion of the set of activities further comprises:
   grouping the portion of the set of activities by at least one of an average of occurrence of activity, a median of occurrence of activity, a maximum of occurrence of activity, and a minimum of occurrence of activity.

4. The computer-implemented method of claim 1, wherein the frequency of occurrence is a number of occurrences over a period of time, and wherein the period of time is determined by a natural cycle of execution of the portion of the set of activities.

5. The computer-implemented method of claim 1 further comprising:
   storing a count of a number of occurrences of each activity of the portion of the set of activities in an assigned counter of a second set of counters for each activity of the portion of the set of activities.

6. The computer-implemented method of claim 1 further comprising:
   managing, by the power manager, the power proxy unit that is included in each one of plurality of chiplets.

7. The computer-implemented method of claim 6, wherein each said power proxy unit operates independently of all other power proxy units.

8. The computer-implemented method of claim 1 further comprising:
   sending the power usage value to the power manager.

9. The computer-implemented method of claim 1, wherein the set of activities are partitioned in a way selected from a group consisting of physically partitioned and logically partitioned.

10. The computer-implemented method of claim 1, wherein the microprocessor includes a plurality of chiplets, and wherein each one of the plurality of chiplets includes a core and a power proxy unit that includes a programmable interface, and further wherein the unit is included in a particular core that is included in a particular one of the plurality of chiplets, the computer-implemented method further comprising:
   monitoring, by a particular power proxy unit that is included in the particular one of the plurality of chiplets, the plurality of counters, wherein the plurality of counters are included in the particular proxy unit that is included in the particular one of the plurality of chiplets; and
   wherein the authorized user uses the programmable interface in the particular one of the plurality of chiplets to specify the set of activities, assign the weight factor to each one of the set of activities, and assign each one of the plurality of counters to a different one of the set of activities.

11. A data processing system for estimating power consumption, the system comprising:
   one or more processors including a microprocessor, one or more computer-readable memories and one or more non-transitory computer-readable storage devices;
   program instructions, stored on at least one of the one or more storage devices for execution by at least one of the one or more processors via at least one of the one or more memories, to receive, from an authorized user, a set of activities for a unit;
   program instructions, stored on at least one of the one or more storage devices for execution by at least one of the one or more processors via at least one of the one or more memories, to store a value for each activity of a portion of the set of activities in an assigned counter of a plurality of counters to form a set of stored values, wherein the value comprises a count multiplied by a weight factor specific to the activity;
   program instructions, stored on at least one of the one or more storage devices for execution by at least one of the one or more processors via at least one of the one or more memories, to group the portion of the set of activities into subsets based on a frequency of occurrence of each activity of the portion of the set of activities and power consumption for each activity of the portion of the set of activities;

program instructions, stored on at least one of the one or more storage devices for execution by at least one of the one or more processors via at least one of the one or more memories, to sum the stored values corresponding to each activity in each said subset to reach a total value for each said subset;

program instructions, stored on at least one of the one or more storage devices for execution by at least one of the one or more processors via at least one of the one or more memories, to multiply the total value of each said subset by a factor corresponding to the subset to form a scaled value for each said subset;

program instructions, stored on at least one of the one or more storage devices for execution by at least one of the one or more processors via at least one of the one or more memories, to add a programmable sign to each said scaled value for each said subset, wherein either a plus sign or a minus sign is added to each said scaled value for each said subset, and wherein the plus sign is added to a first scaled value of a first subset and the minus sign is added to a second scaled value of a second subset, and wherein the programmable sign is used to reduce overestimation of power when ones of the set of activities are double counted; and program instructions, stored on at least one of the one or more storage devices for execution by at least one of the one or more processors via at least one of the one or more memories, to receive, at a power manager, a power usage value comprising a summation of the scaled value of each said subset, wherein the power usage value is an estimation of the power consumption of the portion of the set of activities.

12. The data processing system of claim 11, wherein the power manager adjusts the operational parameters of the unit based on a comparison of the power usage value to a threshold value.

13. The data processing system of claim 11, wherein the program instructions, stored on at least one of the one or more storage devices for execution by at least one of the one or more processors via at least one of the one or more memories, to group the portion of the set of activities into subsets based on the frequency of occurrence of each activity of the portion of the set of activities and the power consumption for each activity of the portion of the set of activities further comprises:

program instructions, stored on at least one of the one or more storage devices for execution by at least one of the one or more processors via at least one of the one or more memories, to group the portion of the set of activities by at least one of an average of occurrence of activity, a median of occurrence of activity, a maximum of occurrence of activity, and a minimum of occurrence of activity.

14. The data processing system of claim 11, wherein the frequency of occurrence is a number of occurrences over a period of time, and wherein the period of time is determined by a natural cycle of execution of the portion of the set of activities.

15. The data processing system of claim 11, wherein the microprocessor includes a plurality of chiplets, and wherein each one of the plurality of chiplets includes a core and a power proxy unit that includes a programmable interface, and further wherein the unit is included in a particular core that is included in a particular one of the plurality of chiplets, the data processing system further comprising:

program instructions, stored on at least one of the one or more storage devices for execution by at least one of the one or more processors via at least one of the one or more memories, to monitor, by a particular power proxy unit that is included in the particular one of the plurality of chiplets, the plurality of counters, wherein the plurality of counters are included in the particular proxy unit that is included in the particular one of the plurality of chiplets; and wherein the authorized user uses the programmable interface in the particular one of the plurality of chiplets to specify the set of activities, assign the weight factor to each one of the set of activities, and assign each one of the plurality of counters to a different one of the set of activities.

16. A computer program product comprising:

one or more non-transitory computer-readable storage devices;

program instructions, stored on at least one of the one or more storage devices, to receive, from an authorized user, a set of activities for a unit, the instructions to be executed by a microprocessor;

program instructions, stored on at least one of the one or more storage devices, to store a value for each activity of a portion of the set of activities in an assigned counter of a plurality of counters to form a set of stored values, wherein the value comprises a count multiplied by a weight factor specific to the activity;

program instructions, stored on at least one of the one or more storage devices, to group the portion of the set of activities into subsets based on a frequency of occurrence of each activity of the portion of the set of activities and power consumption for each activity of the portion of the set of activities;

program instructions, stored on at least one of the one or more storage devices, to sum the stored values corresponding to each activity in each said subset to reach a total value for each said subset;

program instructions, stored on at least one of the one or more storage devices, to multiply the total value of each said subset by a factor corresponding to the subset to form a scaled value for each said subset;

program instructions, stored on at least one of the one or more storage devices, to add a programmable sign to each said scaled value for each said subset, wherein either a plus sign or a minus sign is added to each said scaled value for each said subset, and wherein the plus sign is added to a first scaled value of a first subset and the minus sign is added to a second scaled value of a second subset, and wherein the programmable sign is used to reduce overestimation of power when ones of the set of activities are double counted; and program instructions, stored on at least one of the one or more storage devices, to receive, at a power manager, a power usage value comprising a summation of the scaled value of each subset, wherein the power usage value is an estimation of the power consumption of the portion of the set of activities.

17. The computer program product of claim 16 further comprising:

program instructions, stored on at least one of the one or more storage devices, to adjust, by the power manager, the operational parameters of the unit based on a comparison of the power usage value to a threshold value.

18. The computer program product of claim 16, wherein the program instructions, stored on at least one of the one or more storage devices, to group the portion of the set of activities into subsets based on the frequency of occurrence of each activity of the portion of the set of activities and power consumption for each activity of the portion of the set of activities further comprises:
  program instructions, stored on at least one of the one or more storage devices, to group the portion of the set of activities by at least one of an average of occurrence of activity, a median of occurrence of activity, a maximum of occurrence of activity, and a minimum of occurrence of activity.

19. The computer program product of claim 16, wherein the frequency of occurrence is a number of occurrences over a period of time, and wherein the period of time is determined by a natural cycle of execution of the portion of the set of activities.

20. The computer program product of claim 16, wherein the microprocessor includes a plurality of chiplets, and wherein each one of the plurality of chiplets includes a core and a power proxy unit that includes a programmable interface, and further wherein the unit is included in a particular core that is included in a particular one of the plurality of chiplets, the computer program product further comprising:
  program instructions, stored on at least one of the one or more storage devices, to monitor, by a particular power proxy unit that is included in the particular one of the plurality of chiplets, the plurality of counters, wherein the plurality of counters are included in the particular proxy unit that is included in the particular one of the plurality of chiplets; and
  wherein the authorized user uses the programmable interface in the particular one of the plurality of chiplets to specify the set of activities, assign the weight factor to each one of the set of activities, and assign each one of the plurality of counters to a different one of the set of activities.

* * * * *